No. 876,654. PATENTED JAN. 14, 1908.
W. J. NEEDHAM.
CUTTING APPARATUS FOR MOWERS.
APPLICATION FILED MAR. 18, 1907.
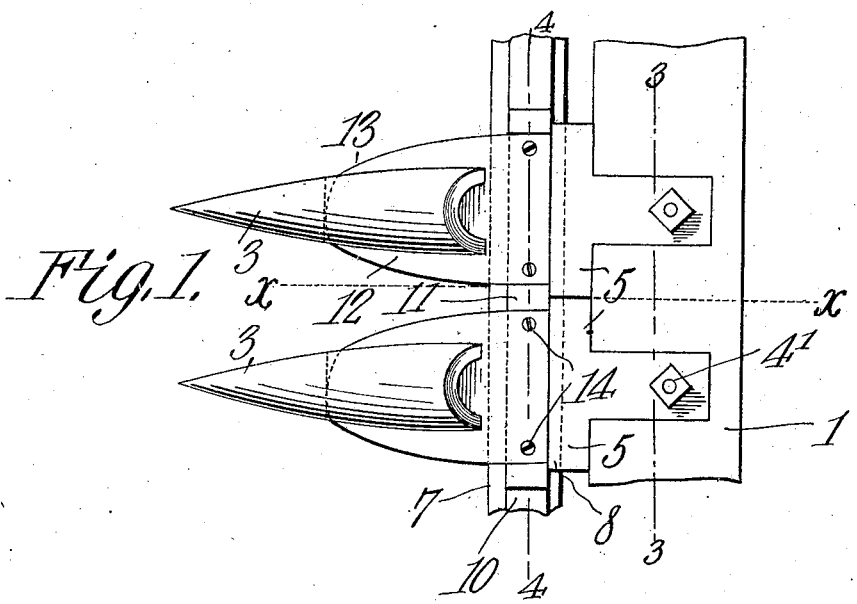
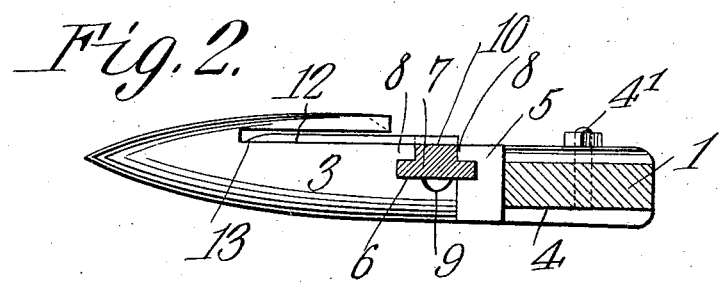
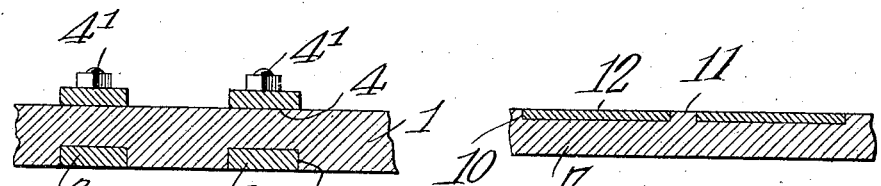
Walter J. Needham,
INVENTOR.
WITNESSES:
By C. A. Snow & Co.
ATTORNEYS

UNITED STATES PATENT OFFICE.

WALTER JACKSON NEEDHAM, OF MYRA, TEXAS.

CUTTING APPARATUS FOR MOWERS.

No. 876,654.  Specification of Letters Patent.  Patented Jan. 14, 1908.

Application filed March 18, 1907. Serial No. 362,969.

*To all whom it may concern:*

Be it known that I, WALTER JACKSON NEEDHAM, a citizen of the United States, residing at Myra, in the county of Cooke and State of Texas, have invented a new and useful Cutting Apparatus for Mowers, of which the following is a specification.

This invention has relation to cutting apparatus for mowers and it consists in the novel construction and arrangement of its parts as hereinafter shown and described.

The object of the invention is to provide a cutting apparatus of such construction as to be especially adapted for cutting weeds, stalks or other similar comparatively heavy growth and which may be easily and readily applied to the mower in lieu of the usual cutting apparatus carried thereby for cutting grass.

In the accompanying drawing:—Figure 1 is a top plan view of a portion of the cutting apparatus. Fig. 2 is a transverse sectional view of the apparatus cut on the line X—X of Fig. 1. Fig. 3 is a longitudinal sectional view of the guard rail cut on the line 3—3 of Fig. 1, and Fig. 4 is a longitudinal sectional view of the sickle bar cut on the line 4—4 of Fig. 1.

The guard rail 1 is provided in its under side with a series of transversely disposed recesses 2, the walls of which are rectangularly disposed with relation to each other. The rear ends of the guards 3 are bifurcated as at 4, which bifurcations receive the forward edge of guard rail 1 and the lower portions of the said guards 3 fit snugly within the recesses 2. The bolts 4' pass transversely through the rear portions of the guards 3 and the guard rail 1 and hold the parts together. Each guard 3 is provided with the laterally disposed shoulders 5 which lie against the forward edge of the rail 1. Each guard is also provided with a transversely extending channel 6 adapted to receive the sickle bar 7. The lugs 8, 8 extend along the upper edges of the channel 6 and retain the sickle bar against vertical movement. The channel 6 is provided in its bottom and at its middle with the valley 9 through which the rivet heads that attach the knives to the sickle bar may pass as the latter reciprocates. The sickle bar 7 is provided with the longitudinally extending intermediate portion 10 which lies between the lugs 8, 8 and has its upper surface flush with the upper surfaces of the said lugs. At intervals along its upper surface the portion 10 is provided with the transversely disposed ribs 11 and the sickle knives are attached to the portion 10 and fit snugly between the ribs 11. The knives 12 are provided with the curved cutting edges 13 and the rivets 14 which form the securing means for the knives 12 to the bar 6 pass transversely through said bar. Thus it will be observed that a substantial means is provided for attaching the guards to the guard rails and for bracing the said guards against themselves and with relation to the said rails. Also the sickle bar is held against all movement except longitudinal movement and that the knives are firmly held upon the sickle bar and are braced at their ends by the integral ribs 11 of the said bar. Also the knives having the rounded cutting ends are especially adapted to sever heavy growth with a shearing cut and coöperating with the ledges of the guards. By this arrangement a cutting apparatus for mowers is provided which is especially adapted for cutting tough or comparatively heavy growth as the parts are so constructed and put together as to be able to withstand a great amount of strain.

Having described my invention what I claim as new and desire to secure by Letters Patent is:—

A cutting apparatus as described comprising a rail, guards mounted upon the same and having transversely disposed channels with oppositely disposed lugs located at the upper edges thereof, a cutter bar mounted for reciprocation in said channels and having a portion lying between said lugs and being retained in the channels by the lugs and knives mounted upon said bar.

In testimony that I claim the foregoing as my own, I have hereto affixed my signature in presence of two witnesses.

WALTER JACKSON NEEDHAM.

Witnesses:
  W. E. MURPHY,
  H. S. HOLMAN.

It is hereby certified that in Letters Patent No. 876,564, granted January 14, 1908, upon the application of Simon Lake, of Berlin, Germany, for an improvement in "Torpedo-Boats," errors appear in the printed specification requiring correction, as follows: In line 62, page 2, the word "tot" should read *to*, and in line 129, page 3, the word *outboard* should be inserted before the word "cap"; and that the said Letters Patent should be read with these corrections therein that the same may conform to the record of the case in the Patent Office.

Signed and sealed this 28th day of January, A. D., 1908.

[SEAL.]

C. C. BILLINGS,
*Acting Commissioner of Patents.*